(12) United States Patent
Ho

(10) Patent No.: US 9,409,189 B2
(45) Date of Patent: Aug. 9, 2016

(54) MODULAR CYCLONIC SEPARATOR FOR SEPARATING SOLID IMPURITIES FROM AN AIRFLOW

(71) Applicant: Yu-Pei Ho, Taichung (TW)

(72) Inventor: Yu-Pei Ho, Taichung (TW)

(*) Notice: Subject to any disclaimer, the term of this patent is extended or adjusted under 35 U.S.C. 154(b) by 22 days.

(21) Appl. No.: 14/225,709

(22) Filed: Mar. 26, 2014

(65) Prior Publication Data
US 2015/0273484 A1    Oct. 1, 2015

(51) Int. Cl.
| | | |
|---|---|---|
| B01D 50/00 | (2006.01) | |
| B04C 9/00 | (2006.01) | |
| B01D 45/16 | (2006.01) | |
| B01D 45/12 | (2006.01) | |
| B01D 45/08 | (2006.01) | |
| B04C 3/04 | (2006.01) | |
| B04C 3/06 | (2006.01) | |
| B04C 7/00 | (2006.01) | |
| B04C 11/00 | (2006.01) | |
| B04C 3/00 | (2006.01) | |

(52) U.S. Cl.
CPC . *B04C 9/00* (2013.01); *B01D 45/08* (2013.01); *B01D 45/12* (2013.01); *B01D 45/16* (2013.01); *B01D 50/002* (2013.01); *B04C 3/04* (2013.01); *B04C 3/06* (2013.01); *B04C 7/00* (2013.01); *B04C 11/00* (2013.01); *B04C 2003/006* (2013.01); *B04C 2009/004* (2013.01)

(58) Field of Classification Search
CPC ...... B04C 9/00; B04C 5/28; B04C 2009/007; B04C 2009/004; B04C 5/13; B04C 5/14; B04C 3/06; B01D 45/16; B01D 45/12; B01D 50/002; B01D 45/08
See application file for complete search history.

(56) References Cited

U.S. PATENT DOCUMENTS

| | | | | |
|---|---|---|---|---|
| 5,725,762 A | * | 3/1998 | Beal | B01D 21/0003 110/221 |
| 5,853,579 A | * | 12/1998 | Rummler | B01D 46/42 110/203 |
| 2007/0295209 A1 | * | 12/2007 | Strauser | B01D 45/16 95/271 |
| 2013/0180404 A1 | * | 7/2013 | Fogelman | B01D 19/0057 95/266 |

* cited by examiner

*Primary Examiner* — Dung H Bui
(74) *Attorney, Agent, or Firm* — Occhiuti & Rohlicek LLP

(57) ABSTRACT

A modular cyclonic separator comprises separating tubes each including an air-guiding impeller that is fixed coaxially in an outer tube body and that is formed with spiral channels for causing an airflow, which flows radially into the separating tube, to follow a cyclonic flow pattern through a separating chamber in the separating tube, thereby separating some of solid impurities from the airflow within the separating chamber. Each separating tube is capable of connecting selectively with one or two three-port valves to form a first or second filtration module, in which the airflow passes through a fluid passage in the one three-port valve or one of the two three-port valves prior to entering the separating tube.

8 Claims, 7 Drawing Sheets

MODULAR CYCLONIC SEPARATOR FOR SEPARATING SOLID IMPURITIES FROM AN AIRFLOW

BACKGROUND OF THE INVENTION

1. Field of the Invention

The invention relates to a cyclonic separator, and more particularly to a modular cyclonic separator for separating solid impurities from an airflow.

2. Description of the Related Art

FIG. 1 illustrates a conventional centrifugal filter 1 that is used to separate solid impurities, such as dust, debris, solid particles, etc., from an airflow using cyclonic principle. The conventional centrifugal filter 1 includes two separating barrels 11, 12, three pipes 131, 132, 133, an exhaust fan 14 and a solid collector 15. Each of the separating barrels 11, 12 has an air inlet 111, 121, and an air outlet 112, 122 and a solid outlet 113, 123 opposite to each other along a central axis thereof. The pipe 131 is connected to the air inlet 111 of the separating barrel 11. The pipe 132 interconnects the air outlet 112 of the separating barrel 11 and the air inlet 121 of the separating barrel 12. The pipe 133 interconnects the air outlet 122 of the separating barrel 12 and the exhaust fan 14. The solid collector 15 is connected to the solid outlets 113, 123. The exhaust fan 4 is operable to draw ambient air through the pipe 111, the separating barrel 11, the pipe 132, the separating barrel 12 and the pipe 133, such that an airflow flowing into each of the separating barrels 11, 12 follows a cyclonic flow pattern so as to separate some of solid impurities from the airflow. The separated solid impurities fall into the solid collector 15 through the solid outlets 113, 123.

In such a configuration, the pipe 132 interconnecting the separating barrels 11, 12 needs to have an adequate length to be bent in a manner that does not affect flowing of the airflow through the pipe 132. Therefore, the pipe 132 occupies a relatively large space. Moreover, when additional one or more separating barrels are used to improve filtration effect, additional one or more pipes like the pipe 132 are required for series connection of the additional separating barrel(s) between the separating barrels 11, 12. In this case, due to the use of the additional pipe (s) and separating barrel (s), the entire volume of the conventional centrifugal filter 1 becomes much larger, and pipe entanglement may occur.

SUMMARY OF THE INVENTION

Therefore, an object of the present invention is to provide a modular cyclonic separator for separating solid impurities from an airflow that can overcome the aforesaid drawbacks of the prior art.

According to the present invention, a modular cyclonic separator comprises:

a plurality of separating tubes, each of which includes an outer tube body having opposite inlet and outlet ends and defining a separating chamber therein in spatial communication with the inlet and outlet ends, and an air-guiding impeller coaxially fixed in the inlet end of the outer tube body, and formed with an axial hole and a plurality of spiral channels that are disposed around the axial hole for causing an airflow, which flows radially into the separating chamber through the spiral channels, to follow a cyclonic flow pattern through the separating chamber and around a central axis of the outer tube body, such that some of solid impurities are separated from the airflow within the separating chamber; and a plurality of three-port valves, each of which has first and second ports with the same size, and a third port, and is configured with a first fluid passage in fluid communication with the first and third ports, and a second fluid passage in fluid communication with the second and third ports.

Each of the separating tubes is capable of connecting selectively with one of the three-port valves to form a first filtration module, in which the inlet end of the outer tube body of the separating tube is connected detachably to the third port of the one of the three-port valves, or with two of the three-port valves to form a second filtration module, in which the inlet and outlet ends of the outer tube body are connected detachably and respectively to the third ports of the two of the three-port valves.

For the first filtration module, the airflow passes through the first fluid passage in the one of the three-port valves prior to entering the separating tube. The airflow in the separating tube flows out of the first filtration module through the second fluid passage in the one of the three-port valves. The separated solid impurities are able to be discharged out of the first filtration module through the outlet end of the outer tube body.

For the second filtration module, the airflow passes through the first fluid passage in one of the two of the three-port valves that connects the inlet end prior to entering the separating tube. The airflow in the separating chamber flows out of the second filtration module through at least one of the second fluid passages in the two of the three-port valves. The separated solid impurities are able to be discharged out of the second filtration module through the first fluid passage and the first port of the other one of the two of the three-port valves.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
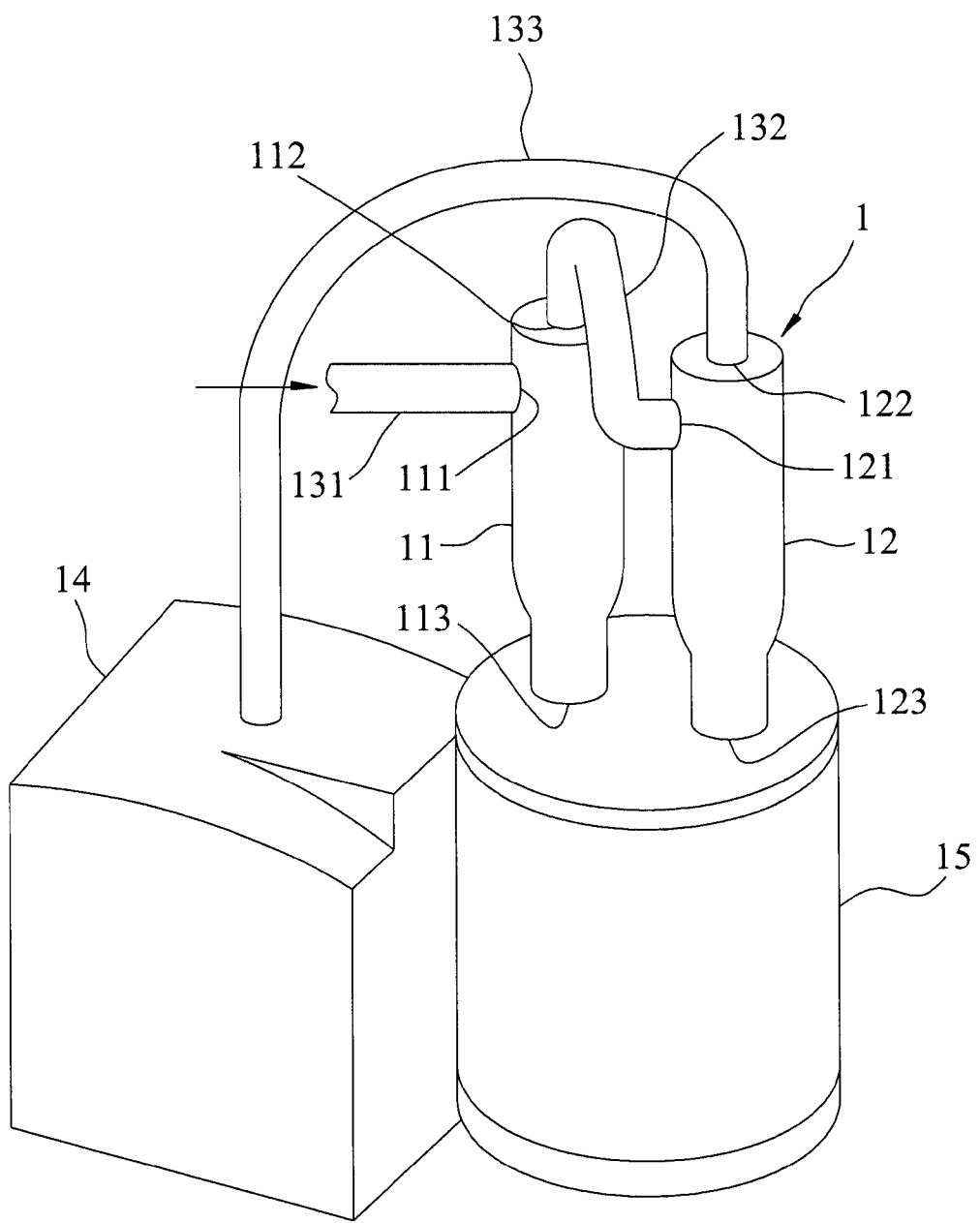
FIG. 1 is a perspective view of a conventional centrifugal filter.

Before the present invention is described in greater detail, it should be noted that like elements are denoted by the same reference numerals throughout the disclosure.

Figure 2:
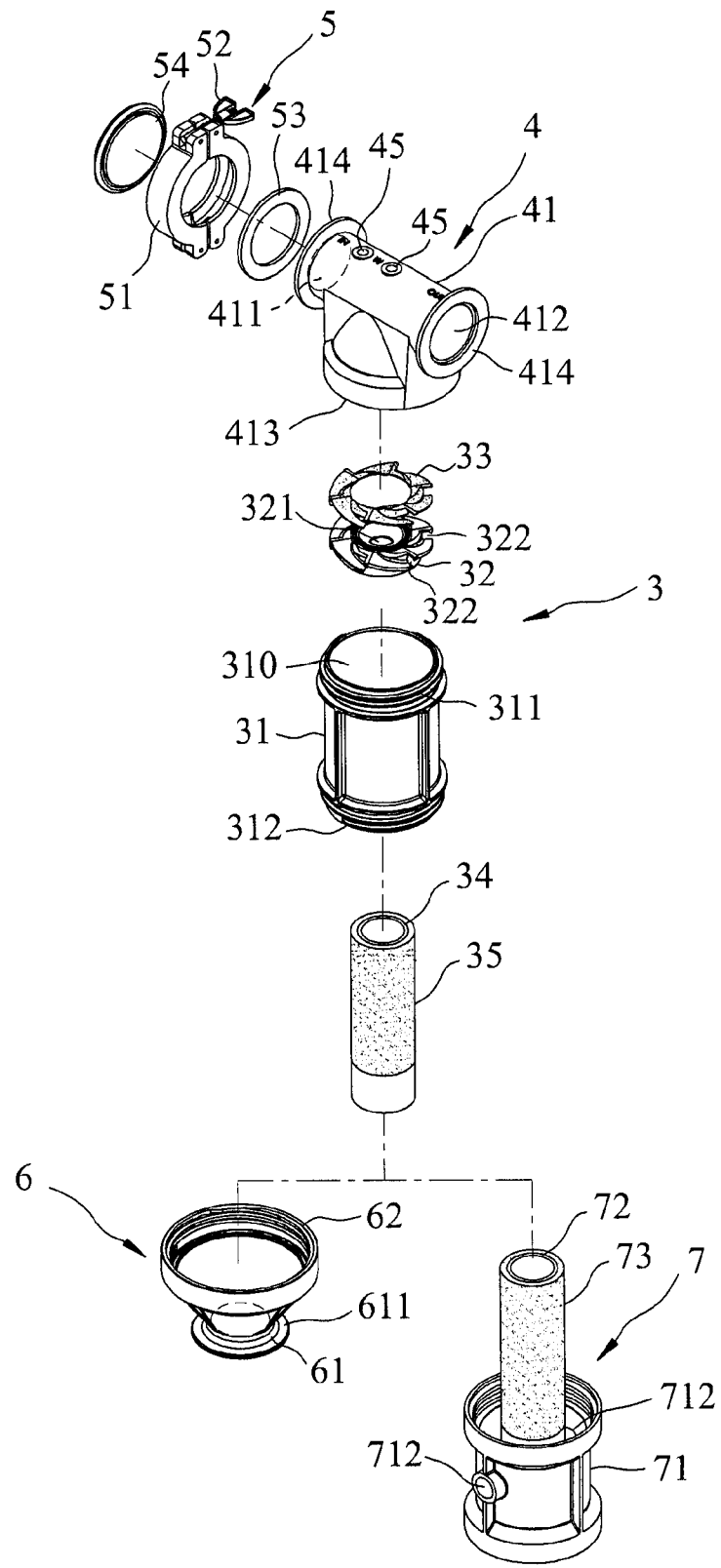
FIG. 2 is a partly exploded perspective view showing some components used in the first and second preferred embodiments of a modular cyclonic separator according to this invention.
Figure 3:
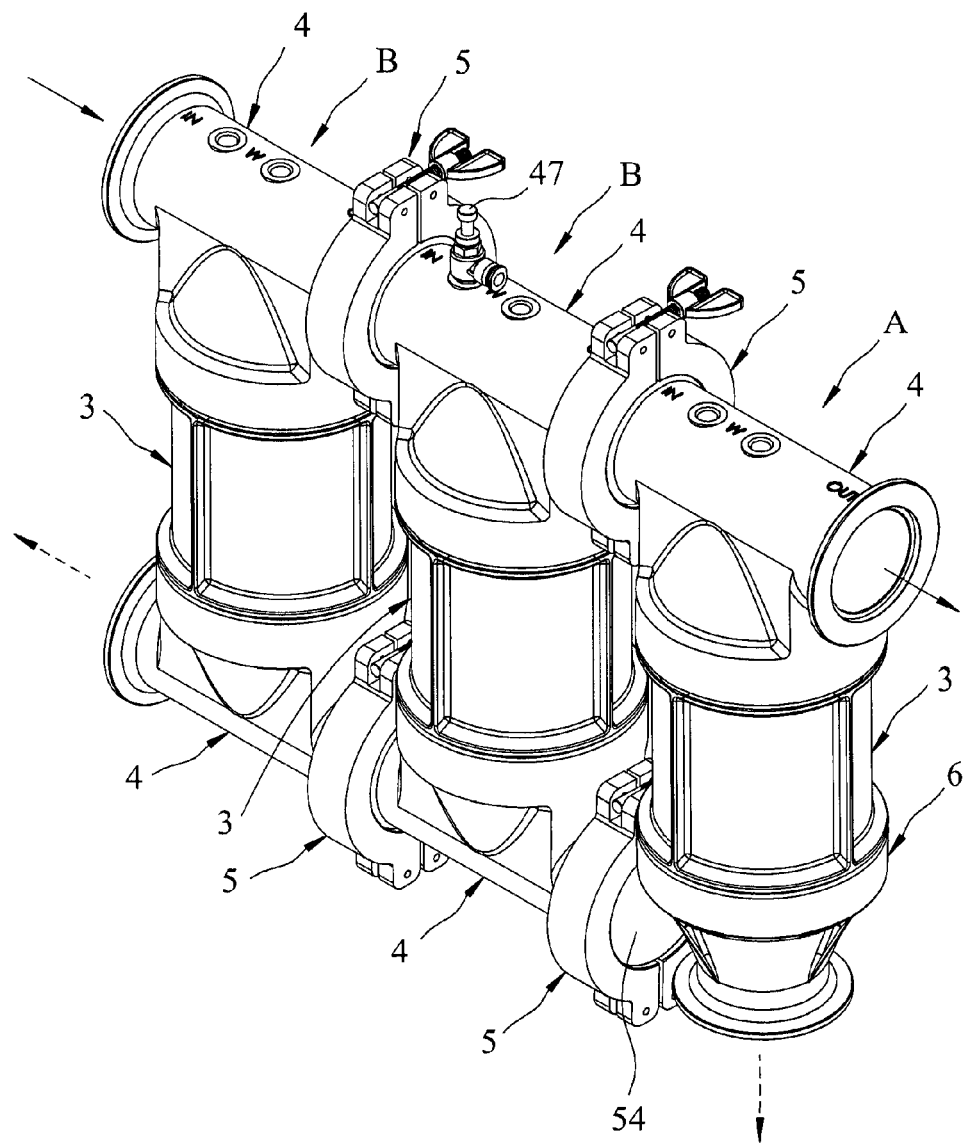
FIG. 3 is a perspective view showing the first preferred embodiment of the modular cyclonic separator of this invention.
Figure 4:
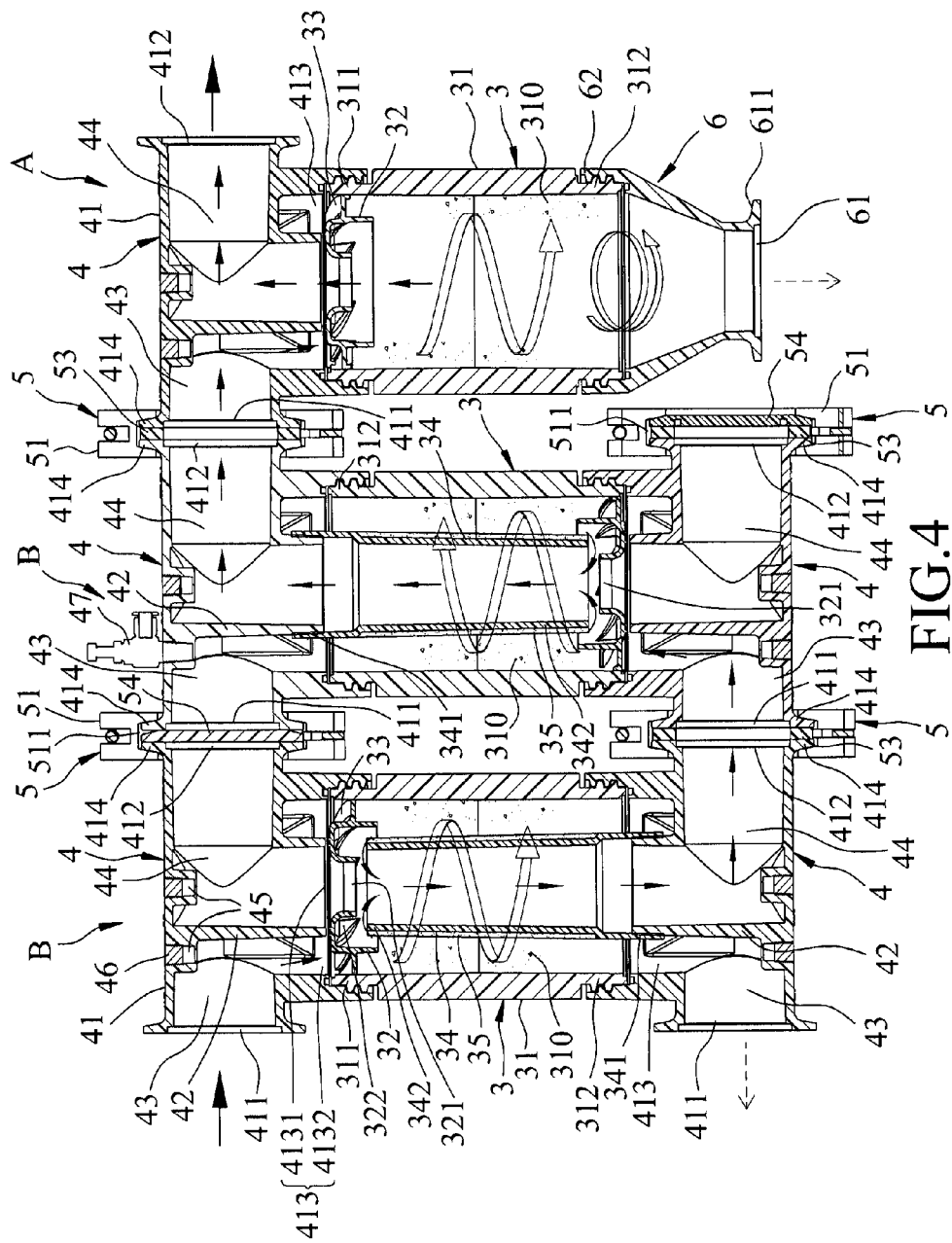
FIG. 4 is a schematic sectional view showing the first preferred embodiment.

Referring to FIGS. 2, 3 and 4, the first preferred embodiment of a modular cyclonic separator according to the present invention is shown to include three separating tubes 3 (hereinafter also referred to as first to third separating tubes 3), five three-port valves (hereinafter also referred to as first to fifth three-port valves 4), and a connecting unit which consists of four connection members 5 (hereinafter also referred to as first to fourth connection members 5) and a connection tube 6.

Each separating tube 3 includes an outer tube body 31, an air-guiding impeller 32 and an impeller-shaped filtering piece 33. For each separating tube 3, the outer tube body 31 has opposite inlet and outlet ends 311, 312, and defines a separating chamber 310 therein in spatial communication with the inlet and outlet ends 311, 312. The air-guiding impeller 32 is coaxially fixed in the inlet end 311 of the outer tube body 31, and is formed with an axial hole 321, and a plurality of spiral channels 322 disposed around the axial hole 321 for causing an airflow, which flows radially into the separating chamber 310 through the spiral channels 322, to follow a cyclonic flow pattern through the separating chamber 310, as indicated by spiral hollow arrows in FIG. 4, such that some of solid impurities, such as dust, debris and solid particles, are separated from the airflow within the separating chamber 310. The impeller-shaped filtering piece 33 is made of a foam material, and is attached fittingly over the air-guiding impeller 32 for filtering a portion of debris in the airflow.

Each three-port valve 4 includes a T-shaped valve body 41 that has opposite first and second ports 411, 412 with the same size, and a third port 413 corresponding in size to the inlet or outlet end 311, 312 of each separating tube 3 and being greater in size than the first and second ports 411, 412, and that is formed integrally with an internal partitioning tube body 42 for partitioning an interior of the T-shaped valve body 41 into a first fluid passage 43 in fluid communication with the first and third ports 411, 413, and a second fluid passage 44 in fluid communication with the second and third ports 412, 413. For each three-port valve 4, the internal partitioning tube body 42 extends coaxially toward the third port 413 in a manner that the third port 413 is partitioned by the internal partitioning tube body 42 into a central portion 4131, which is in fluid communication with the second fluid passage 44, and a peripheral portion 4132, which surrounds the central portion 4131 and is in fluid communication with the first fluid passage 43. In addition, the T-shaped valve body 41 is formed with two holes 45 that are in spatial communication respectively with the first and second fluid passages 43, 44, and two annular rim flanges 414 that define respectively the first and second ports 411, 412. In use, each hole 45 is used to be selectively plugged by a plug 46 or a fluid injection valve 47, which is used to inject a fluid, such as water or a cleaning fluid, into the T-shaped valve body 41 (see FIG. 4).

In this embodiment, the inlet end 311 of the third separating tube 3 (i.e., the rightmost one in FIG. 4) is connected threadedly to the third port 413 of the fifth three-port valve 4 (i.e., the upper right one in FIG. 4), such that the third separating tube 3 cooperates with the fifth three-port valve 4 to form a first filtration module (A). The inlet and outlet ends 311, 312 of the first separating tube 3 (i.e., the leftmost one in FIG. 4) are connected threadedly to the third ports 413 of the first and second three-port valves 4 (i.e., the upper left and lower left ones in FIG. 4), respectively, such that the first separating tube 3 cooperates with the first and second three-port valves 4 to form a second filtration module (B). Similarly, the second separating tube 3 (i.e., the middle one in FIG. 4) connects with the third and fourth three-port valves 4 (i.e., the lower middle and upper middle ones in FIG. 4) in the same way to form another second filtration module (B). It is noted that, for the second filtration modules (B), each of the first and second separating tubes 3 further includes an inner tube body 34 that is disposed coaxially in the outer tube body 31 and that has a connecting end 341 extending outwardly of the outlet end 312 of the outer tube body 31 and connected to the internal partitioning tube body 42 of a respective one of the second and fourth three-port valves 4, and a free end 342 opposite to the connecting end 341 and adjacent to the axial hole 321 in the air-guiding impeller 32, such that the separating chamber 310 is defined between the outer tube body 31 and the inner tube body 34 and such that the inner tube body 34 is in fluid communication with the second fluid passage 44 in a respective one of the second and fourth three-port valves 4. In addition, a filtering sleeve 35 made of a foam material is sleeved fittingly on the inner tube body 34. For each of the first and second filtration modules (A, B), the central portion 4131 and the peripheral portion 4132 of the third port 413 of the three-port valve 4, which connects the inlet end 311 of the separating tube 3, correspond respectively in position to the axial hole 321 and the group of the spiral channels 322 in the air-guiding impeller 32.

The connection tube 6 has a first end 61 corresponding to the first or second port 411, 412 of each three-port valve 4 in size, and a second end 62 opposite to the first end 61 and capable of connecting threadedly with the inlet or outlet end 311, 312 of each separating tube 3. The connection tube 6 is formed with an annular rim flange 611 that defines the first end 61. In this embodiment, the second end 62 of the connection tube 6 is connected threadedly to the outlet end 312 of the third separating tube 3.

Each connection member 5 is used to connect with one three-port valve 4, or interconnect two adjacent three-port valves 4 or one three-port valve 4 and the connection tube 6 (not shown in this embodiment). Each connection member 5 includes a C-shaped retaining ring 51 that is formed with an inner annular groove 511 for engaging one annular rim flange 414 of the one three-port valve 4, or engaging corresponding two annular rim flanges 414 of the two adjacent three-port valves 4 that face each other, or engaging one annular rim flange 414 of the one three-port valve 4 and the annular rim flange 611 of the connection tube 6, and an anchoring piece 52 that is for anchoring opposite ends of the c-shaped retaining ring 51 to maintain connection with the one three-port valve 4 or connection between the two adjacent three-port valves 4 or between the one three-port valve 4 and the connection tube 6. Each connection member 5 further includes a spacer unit configured as a washer 53 and a cover body 54 (see FIG. 2) that selectively engage the inner annular groove 511 in the C-shaped retaining ring 51 together with the one annular rim flange 414 of the one three-port valve 4, or configured as one of the washer 53 and the cover body 54 that selectively engages the inner annular groove 511 in the C-shaped retaining ring 51 together with the corresponding two annular rim flanges 414 or together with the one annular rim flange 414 of the one three-port valve 4 and the annular rim flange 611 of the connection tube 6, and that is clamped between the corresponding two annular rim flanges 414 or between the one annular rim flange 414 of the one three-port valve 4 and the annular rim flange 611 of the connection tube 6. In this embodiment, referring to FIG. 4, the first connection member 5 (i.e., the upper left one) interconnects the second port 412 of the first three-port valve 4 and the first port 411 of the fourth three-port valve 4, wherein the cover body 54 is clamped sealingly between corresponding two annular rim flanges 414 of the first and fourth three-port valves 4 for blocking fluid communication between the second port 412 of the first three-port valve 4 and the first port 411 of the fourth three-port valve 4. The second connection member 5 (i.e., the lower left one) interconnects the second port 412 of the second three-port valve 4 and the first port 411 of the third three-port valve 4, wherein the washer 53 is clamped sealingly between corresponding two annular rim flanges 414 of the second and third three-port valves 4. The third connection member 5 (i.e., the upper right one) interconnects the second port 412 of the fourth three-port valve 4 and the first port 411 of the fifth three-port valve 4, wherein the washer 53 is clamped sealingly between corresponding two annular rim flanges 414 of the fourth and fifth three-port valves 4. The fourth connection member 5 (i.e., the lower right one) connects with the second port 412 of the third three-port valve 4, wherein the washer 53 and the cover body 54 engages the inner annular groove 511 together with one annular rim flange 414 of the third three-port valve 4 for blocking the second port 412 of the third three-port valve 4.

In such a configuration, for each of the first and second filtration modules (A, B), an airflow passes through the first fluid passage 43 in the three-port valve 4, which connects with the inlet end 311 of the separating tube 3, prior to entering the separating tube 3. The airflow within the separating chamber 310 flows out of the first filtration module (A) through the second passage 44 in the three-port valve 4 thereof, whereas the airflow within the separating chamber 310 flows out of each second filtration module (B) through the second passage 44 in the three-port valve 4, which connects the outlet end 312 of the separating tube 3. Accordingly, the airflow entering the modular cyclonic separator of this embodiment flows along a flow path indicated by the solid line arrows in FIG. 4 to thereby be filtered three times. At the same time, the separated solid impurities are able to be discharged through the first port 411 of the second three-port valve 4 and through the connection tube 6, as indicated by the dashed line arrows in FIG. 4. Furthermore, due to the presence of the fluid injection valve 47 provided on fourth three-port valve 4, the fluid injected from the fluid injection valve 47 passes through the first fluid passage in the fourth three-port valve 4 and into the separating chamber 310 in the second separating tube 3, and is easily combined with the solid impurities within the separating chamber 310 to add weight to the solid impurities so as to facilitate easier separation of the solid impurities from the airflow within the separating chamber 310 under the action of centrifugal force.

Figure 5:
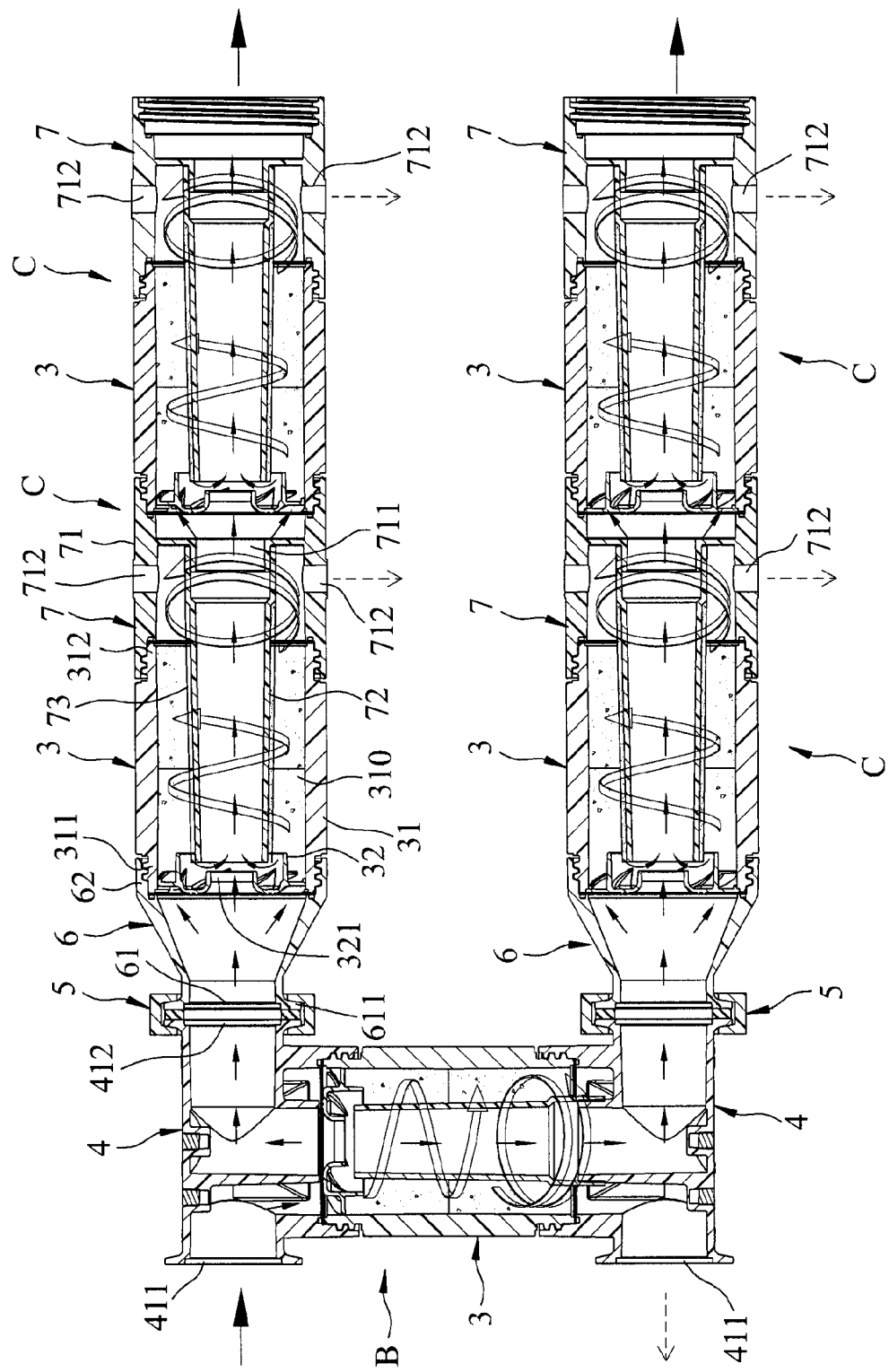
FIG. 5 is a schematic sectional view showing the second preferred embodiment of the modular cyclonic separator according to this invention.

FIG. 5 illustrates the second preferred embodiment of a modular cyclonic separator according to this invention, which is a modification of the first preferred embodiment. In this embodiment, the modular cyclonic separator includes one second filtration module (B), two connection tubes 6, two connecting members 5, and four third filtration modules (C).

In this embodiment, each connection member 5 interconnects the second port 412 of a respective three-port valve 4 of the second filtration module (B) and the first end 611 of a respective connection tube 6 in the same way as the second and third connection members 5 of the first preferred embodiment illustrated in FIG. 4.

The third filtration modules (C) are divided into two groups, each of which consists of two filtration modules (C) connected detachably to each other and is connected threadedly to the second end 62 of a respective connection tube 6. Each third filtration module (C) includes one separating tube 3 and an extension tube 7. The extension tube 7 includes a tubular tube-mounting seat body 71 formed with a central hole 711 and a plurality of radial holes 712, an elongate tube body 72 mounted coaxially on the tube-mounting seat body 71, and a filtering sleeve 73 made of a foam material and sleeved fittingly on the tube body 72. The outlet end 312 of the separating tube 3 is connected threadedly to the tube-mounting seat body 71 in a manner that the tube body 72 extends into the outer tube body 31 through the outlet end 312 of the outer tube body 31 and adjacent to the axial hole 321 in the air-guiding impeller 32, such that the separating chamber 310 is defined between the outer tube body 31 of the separating tube 3 and the tube body 72 of the extension tube 7 and is in fluid communication with the radial holes 712 in the tube-mounting seat body 71.

In such a configuration, an airflow entering the second filtration module (B) through the first port 411 of one of the three-port valves 4 is filtered and then is divided into two sub-airflows, as indicated by the solid line arrows in the second filtration module (B) of FIG. 5, each of which passes through a respective connection tube 6 to serve as an airflow to flow into a respective group of the third filtration modules (C). Subsequently, the airflow entering each group of the third filtration modules (C) is filtered twice, and flows out of the group of the third filtration modules (C) through the extension tube 7 of the distal one of the third filtration modules (C). At the same time, the separated solid impurities are able to be discharged out of the modular cyclonic separator through the first port 411 of the other one of the three-port valves 4 and the radial holes 712, as indicated by the dashed line arrows in FIG. 5.

Figure 6:
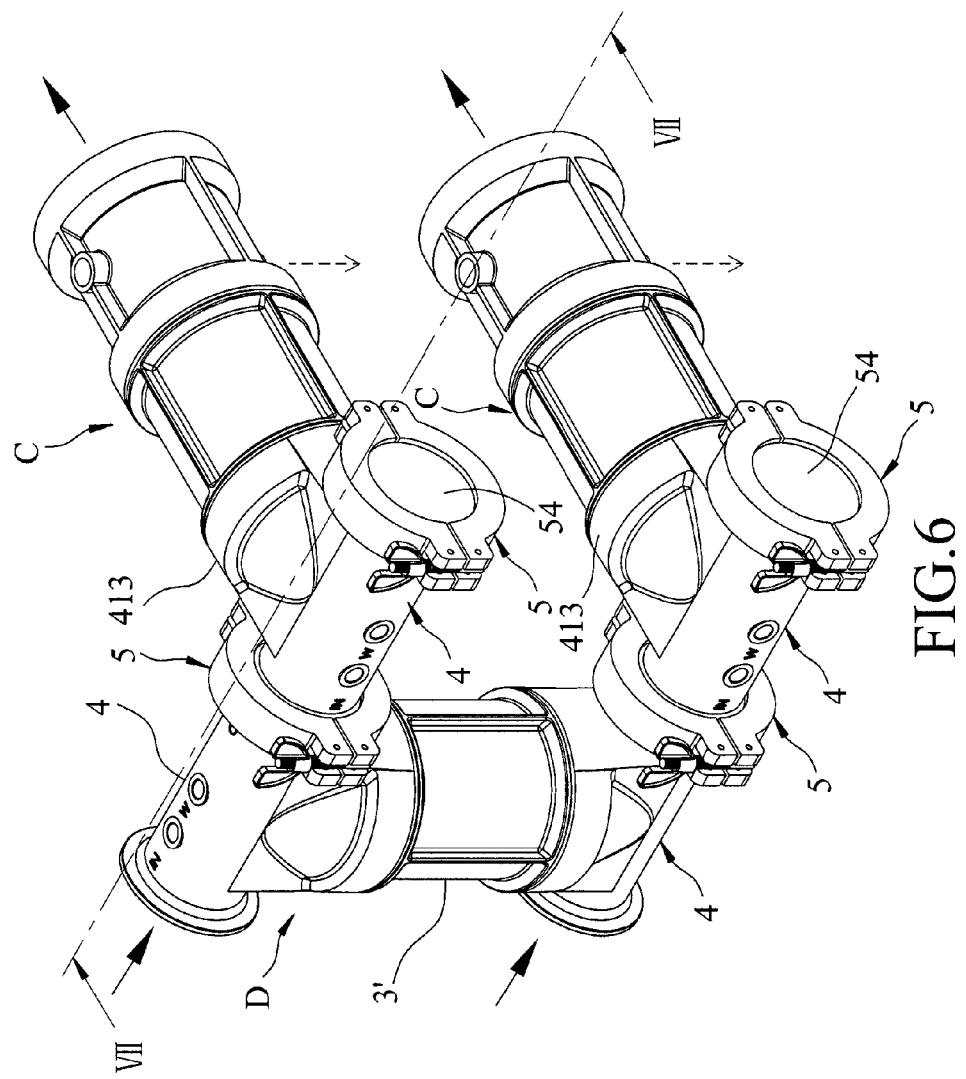
FIG. 6 is a perspective view showing the third preferred embodiment of the modular cyclonic separator according to this invention.
Figure 7:
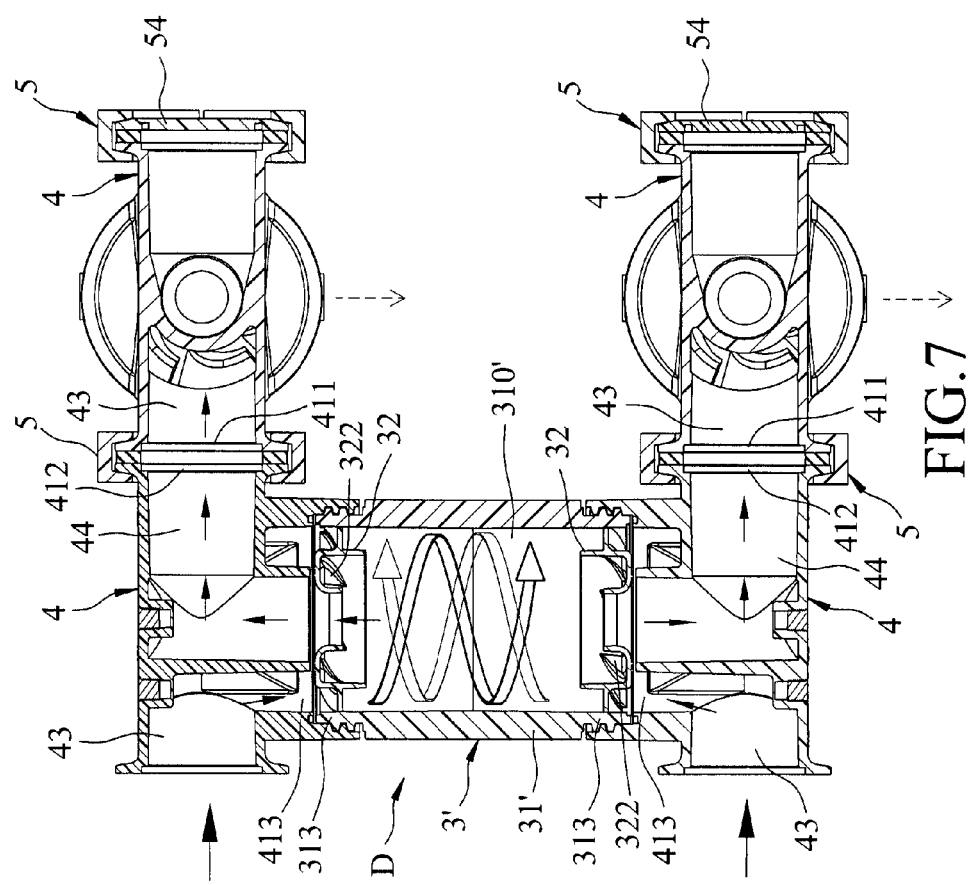
FIG. 7 is a schematic sectional view of the third preferred embodiment taken along line VII-VII in FIG. 6.

FIGS. 6 and 7 illustrate the third preferred embodiment of a modular cyclonic separator according to this invention, which is a modification of the second preferred embodiment. In this embodiment, the modular cyclonic separator includes a mix module (D), two additional three-port valves 4, four connect ion members 5 and two third filtration modules (C).

The mix module (D) is a modification of the second filtration module (B) of the second preferred embodiment (FIG. 5). Unlike the second filtration module (B), the mix module (D) includes two three-port valves 4, and a mixing tube 3' instead of the separating tube 3 (FIG. 5). The mixing tube 3' includes a tube body 31' and two air-guiding impellers 32. The tube body 31' has opposite open ends 313 connected threadedly and respectively to the third ports 413 of the three-port valves 4 thereof, and defines a mixing chamber 310' therein in fluid communication with the open ends 313. It is noted that the tube body 31' is identical to the outer tube body 31 (FIG. 5). Each air-guiding impeller 32 is coaxially fixed in a respective open end 313 of the tube body 31' for causing an airflow, which flows radially into the mixing chamber 310' through the spiral channels 322, to follow a cyclonic flow pattern through the mixing chamber 310' and around a central axis of the tube body 31'. As a result, for the mix module (D), two airflows, which pass respectively through the first fluid passages 43 of the three-port valves 4 and then enter the mixing tube 3' respectively through the open ends 313, are mixed together in the mixing chamber 310'. Thereafter, the mixed airflow in the mixing chamber 310' flows out of the mix module (D) in two streams respectively through the second fluid passages 44 in the three-port valves 4 of the mix module (D).

For each additional three-port valve 4, the third port 413 is connected threadedly to a respective third filtration module (C), and the first port 411 is connected to the second port 412 of a respective three-port valve 4 of the mix module (D) using a corresponding connection member 5 in a manner that the second port 412 of the respective three-port valve 4 of the mix module (D) is in fluid communication with the respective third filtration module (C) through the first fluid passage 43 in the additional three-port valve 4. In addition, the second port 412 of each additional three-port valve 4 is blocked by the cover body 54 of a corresponding connection member 5, which connects therewith. Accordingly, the two streams of the mixed airflow from the mix module (D) respectively pass through the first fluid passages 43 in the additional three-port valves 4 and then respectively enter the third filtration modules (C) to be filtered.

To sum up, since the modular cyclonic separator of this invention can be assembled selectively using the first filtration module(s) (A), the second filtration module(s) (B), the third filtration module(s) (C) and/or the mix module (D) without requiring any pipe for interconnection, the modular cyclonic separator of this invention can be easily assembled to have a relatively small volume, which meets actual spatial needs, can provide multi-filtration effect and can avoid pipe entanglement encountered in the prior art.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A modular cyclonic separator comprising:
    a plurality of separating tubes, each of which includes an outer tube body having an inlet end and an outlet, said outer tube body defining a separating chamber therein that is in spatial communication with said inlet end and outlet end, and an air-guiding impeller coaxially fixed in said inlet end of said outer tube body, and formed with an axial hole and a plurality of spiral channels that are disposed around said axial hole for causing an airflow, which flows radially into said separating chamber through said spiral channels, to follow a cyclonic flow pattern through said separating chamber and around a central axis of said outer tube body, such that some of solid impurities are separated from the airflow within said separating chamber; and
    a plurality of three-port valves, each of which has a first port and a second port, said second port substantially of equal size to said first port and a third port, said plurality of three-port valves being configured with a first fluid passage in fluid communication with said first and third ports, and a second fluid passage in fluid communication with said second and third ports;
    wherein each of said separating tubes is capable of connecting selectively with one of said three-port valves to form a first filtration module, in which said inlet end is connected detachably to said third port of said one of said three-port valves, or with two of said three-port valves to form a second filtration module, in which said inlet and outlet ends are connected detachably and respectively to each third port of said two of said three-port valves;
    wherein said first filtration module, the airflow passes through said first fluid passage in said one of said three-port valves prior to entering said separating tube, the airflow in a separating tube of said plurality of separating tubes flowing out of said first filtration module through said second fluid passage in one of said three-port valves, the solid impurities separated from the airflow being able to be discharged out of said first filtration module through said outlet end of said outer tube body;
    wherein said second filtration module, the airflow passes through said first fluid passage in one of two of said three-port valves that connects said inlet end prior to entering said separating tube, the airflow in said separating chamber flowing out of said second filtration module through said second fluid passage in said two of said three-port valves, the solid impurities separated from the airflow being able to be discharged out of said second filtration module through said first fluid passage and said first port of the other one of said two of said three-port valves; and
    wherein each of said three-port valves includes a T-shaped valve body that has said first port, said second port and said third port, said T-shaped valve body being formed integrally with an internal partitioning tube body for partitioning an interior of said T-shaped valve body into said first fluid passage and said second fluid passage, said internal partitioning tube body of each of said three-port valves extending coaxially toward said third port in a manner that said third port is partitioned by said internal partitioning tube body into a central portion, which is in fluid communication with said second fluid passage, and a peripheral portion, which surrounds said central portion and is in fluid communication with said first fluid passage.

2. The modular cyclonic separator as claimed in claim 1, further comprising at least one extension tube that includes a tubular tube-mounting seat body formed with a central hole and a plurality of radial holes, an elongate tube body mounted coaxially on said tube-mounting seat body, and a filtering sleeve made of a foam material and sleeved fittingly on said tube body;
    wherein each of said separating tubes is capable of connecting selectively with said extension tube to form a third filtration module, in which said tube-mounting seat body is connected detachably to said outlet end of said outer tube body in a manner that said tube body extends into said outer tube body through said outlet end and adjacent to said axial hole in said air-guiding impeller, such that said separating chamber is defined between said outer tube body and said tube body, and is in fluid communication with said radial holes, such that the airflow in said separating chamber flows out of said third filtration module through said tube body and said central hole, and such that the separated solid impurities are able to be discharged out of said third filtration module through said radial holes.

3. The modular cyclonic separator as claimed in claim 1, further comprising a mixing tube that includes
    a tube body having opposite open ends and defining a mixing chamber therein in fluid communication with said open ends, and
    two air-guiding impellers, each of which is coaxially fixed in a respective one of said open ends of said tube body and is formed with an axial hole, and a plurality of spiral channels disposed around said axial hole for causing an airflow, which flows radially into said mixing chamber through said spiral channels, to follow a cyclonic flow pattern through said mixing chamber and around a central axis of said tube body, such that the two airflows entering said mixing tube respectively through said open ends are mixed together in said mixing chamber;
    wherein said mixing tube is capable of connecting selectively with two of said three-port valves to form a mix module, in which said open ends of said tube body are connected detachably and respectively to said third ports of said two of said three-port valves, such that, for said mix module, the two airflows pass respectively through said first fluid passages of said two of said three-port valves prior to entering said mixing tube, and such that the mixed airflow in said mixing chamber flow out of said mix module in two streams respectively through said second fluid passages of said two of said three-port valves.

4. The modular cyclonic separator as claimed in claim 3, wherein:

each of said three-port valves includes a T-shaped valve body that has said first, second and third ports and that is formed integrally with an internal partitioning tube body for partitioning an interior of said T-shaped valve body into said first and second fluid passages, said internal partitioning tube body of each of said three-port valves extending coaxially toward said third port in a manner that said third port is partitioned by said internal partitioning tube body into a central portion, which is in fluid communication with said second fluid passage, and a peripheral portion, which surrounds said central portion and is in fluid communication with said first fluid passage, said T-shaped valve body of each of said three-port valves being formed with two holes, which are in spatial communication respectively with said first and second fluid passages, and each of which is used to be selectively plugged by a plug or a fluid injection valve for injecting a fluid into said T-shaped valve body; and for each of said first and second filtration modules and said mix module, said central portion and said peripheral portion of said third port of said three-port valve, which is connected to said inlet end of said outer tube body of said separating tube or one of said open ends of said tube body of said mixing tube, correspond respectively in position to said axial hole and said spiral channels in said air-guiding impeller of said separating tube or in a corresponding one of said air-guiding impellers of said mixing tube.

5. The modular cyclonic separator as claimed in claim 4, wherein, for said second filtration module, said separating tube further includes:

an inner tube body that is disposed coaxially in said outer tube body and that has a connecting end extending outwardly of said outlet end of said outer tube body and connected to said internal partitioning tube body of the other one of said two of said three-port valves, and a free end opposite to said connecting end and adjacent to said axial hole in said air-guiding impeller, such that said separating chamber is defined between said outer tube body and said inner tube body and such that said inner tube body is in fluid communication with said second fluid passage in the other one of said two of said three-port valves; and a filtering sleeve that is made of a foam material and that is sleeved fittingly on said inner tube body.

6. The modular cyclonic separator as claimed in claim 4, further comprising a connecting unit that includes:

at least one connection tube having a first end that corresponds to said first or second port of each of said three-port valves in size, and a second end that is opposite to said first end and that is capable of connecting detachably with said inlet or outlet end of said outer tube body of each of said separating tubes;

at least one connection member for selectively connecting with said first or second port of one of said three-port valves, or interconnecting two adjacent ones of said three-port valves or one of said three-port valves and said connection tube.

7. The modular cyclonic separator as claimed in claim 6, wherein:

said T-shaped valve body of each of said three-port valves is formed with two annular rim flanges that define respectively said first and second ports;

said connection tube is formed with an annular rim flange that defines said first end; and said connection member includes a C-shaped retaining ring that is formed with an inner annular groove for engaging one of said annular rim flanges of said one of said three-port valves, engaging corresponding two annular rim flanges of said two adjacent ones of said three-port valves that face each other, or engaging one of said annular rim flanges of said one of said three-port valves and said annular rim flange of said connection tube, and an anchoring piece for anchoring opposite ends of said C-shaped retaining ring to maintain connection with said one of said three-port valves or connection between said two adjacent ones of said three-port valves or between said one of said three-port valves and said connection tube.

8. The modular cyclonic separator as claimed in claim 7, wherein said connection member further includes a spacer unit configured as a cover body and a washer that selectively engage said inner annular groove in said C-shaped retaining ring together with said one of said annular rim flanges of said one of three-port valves, or configured as one of said cover body and said washer that selectively engages said inner annular groove in said C-shaped retaining ring together with the corresponding two annular rim flanges or together with said one of said annular rim flanges of said one of said three-port valves and said annular rim flange of said connection tube, and that is clamped between the corresponding two annular rim flanges or between said one of said annular rim flanges of said one of said three-port valves and said annular rim flange of said connection tube.

* * * * *